United States Patent
Campbell

(10) Patent No.: US 9,638,234 B2
(45) Date of Patent: May 2, 2017

(54) METHODS AND APPARATUS FOR MULTI-DIMENSIONAL ASYMMETRICAL FASTENING SYSTEM

(71) Applicant: Bryce Fastener Company, Inc., Gilbert, AZ (US)

(72) Inventor: Richard Bryce Campbell, Gilbert, AZ (US)

(73) Assignee: Bryce Fastener Company, Inc., Gilbert, AZ (US)

(*) Notice: Subject to any disclaimer, the term of this patent is extended or adjusted under 35 U.S.C. 154(b) by 282 days.

(21) Appl. No.: 14/469,874

(22) Filed: Aug. 27, 2014

(65) Prior Publication Data

US 2016/0061246 A1 Mar. 3, 2016

(51) Int. Cl.
*F16B 23/00* (2006.01)
*B25B 15/00* (2006.01)

(52) U.S. Cl.
CPC .......... *F16B 23/003* (2013.01); *B25B 15/004* (2013.01); *F16B 23/0046* (2013.01)

(58) Field of Classification Search
CPC .. F16B 23/003; F16B 23/0046; F16B 41/005; B25B 15/004
See application file for complete search history.

(56) References Cited

U.S. PATENT DOCUMENTS

| | | | |
|---|---|---|---|
| 2,285,461 A | 5/1939 | Purtell | |
| 3,241,408 A | 3/1966 | McCauley | |
| 3,874,258 A | 4/1975 | Semola et al. | |
| D285,651 S | 9/1986 | Iwata et al. | |
| 5,674,037 A | 10/1997 | Lu | |
| 5,730,567 A | 3/1998 | Haseley et al. | |
| 6,017,177 A | 1/2000 | Lanham | |
| 6,295,900 B1 | 10/2001 | Julicher et al. | |
| 6,406,376 B1 | 6/2002 | Lin | |
| 6,698,315 B1* | 3/2004 | Wright | B25B 13/065 81/121.1 |
| 6,698,316 B1* | 3/2004 | Wright | B25B 13/065 81/121.1 |
| 6,725,746 B1* | 4/2004 | Wright | B25B 13/065 81/121.1 |
| 6,904,833 B2* | 6/2005 | Wright | B25B 13/065 81/121.1 |
| 7,174,811 B2* | 2/2007 | Wright | B25B 13/065 411/403 |
| D567,643 S | 4/2008 | Campbell | |
| D568,731 S | 5/2008 | Campbell | |
| 7,484,440 B2 | 2/2009 | Wright | |
| 7,568,872 B2 | 8/2009 | Schultz | |

(Continued)

FOREIGN PATENT DOCUMENTS

DE 29606408 U1 6/1996

*Primary Examiner* — David B Thomas
(74) *Attorney, Agent, or Firm* — The Noblitt Group, PLLC

(57) ABSTRACT

Methods and apparatus for a multi-dimensional asymmetrical fastening system according to various aspects of the present technology include a driver and a fastener that are configured to have corresponding conforming surfaces suitably adapted to provide engagement between a plurality of driver fins and a recessed receiving area of the fastener. The driver and fastener may each be configured to include driving surfaces of varying widths. Variable widths allow for the customization of a given driver/fastener system.

16 Claims, 8 Drawing Sheets

(56) References Cited

U.S. PATENT DOCUMENTS

| | | |
|---|---|---|
| 8,388,294 B2 | 3/2013 | Lanneree |
| 8,545,156 B2 * | 10/2013 | Kageyama ............ B25B 15/005 |
| | | 411/402 |
| 9,004,836 B2 * | 4/2015 | Wells .................. F16B 23/0007 |
| | | 411/402 |
| 2012/0099944 A1 * | 4/2012 | Kageyama ............ B25B 15/005 |
| | | 411/403 |
| 2013/0068075 A1 | 3/2013 | Stiebitz et al. |
| 2015/0093212 A1 * | 4/2015 | Pinheiro ............... F16B 35/045 |
| | | 411/403 |

* cited by examiner

METHODS AND APPARATUS FOR MULTI-DIMENSIONAL ASYMMETRICAL FASTENING SYSTEM

BACKGROUND OF INVENTION

Presently fasteners are made with various recessed openings for receiving a matched driving tool such as the Phillips design, straight walled hexagon, and other multi-lobe geometries. The walls and faces of the driver and recess typically are designed to fit closely with each other in order to achieve face-to-face (mating) contact between the driving member and driven surfaces of the fastener. Some types of fasteners directed towards increasing security utilize non-standard recessed openings in an attempt to thwart the removal of a fastener. For example, non-standard recessed openings may include rounded surfaces designed to prevent loosening of an installed fastener, various geometric shapes such as hexagons or polygons, and varying recessed wall shapes incorporated rounded curves. Although non-standard designs may increase security to some degree they are not 100% effective.

SUMMARY OF THE INVENTION

Methods and apparatus for a multi-dimensional asymmetrical fastening system according to various aspects of the present technology include a driver and a fastener that are configured to have corresponding conforming surfaces suitably adapted to provide engagement between a plurality of driver fins and a recessed receiving area of the fastener. The driver and fastener may each be configured to include driving surfaces of varying widths. Variable widths allow for the customization of a given driver/fastener system.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various types of materials, fastening devices, driver systems and the like, which may carry out a variety of functions. In addition, the present invention may be practiced in conjunction with any number of processes such as the manufacture of fasteners, mechanical attachment, and torque transmitting systems, and the system described is merely one exemplary application for the invention. Further, the present invention may employ any number of conventional techniques for metalworking, component manufacturing, tooling fabrication, and/or forming surfaces.

Methods and apparatus for an asymmetrical fastening system according to various aspects of the present invention may operate in conjunction with any suitable torque delivery system. Various representative implementations of the present invention may also be applied to any device capable of rotating fasteners.

Figure 1:
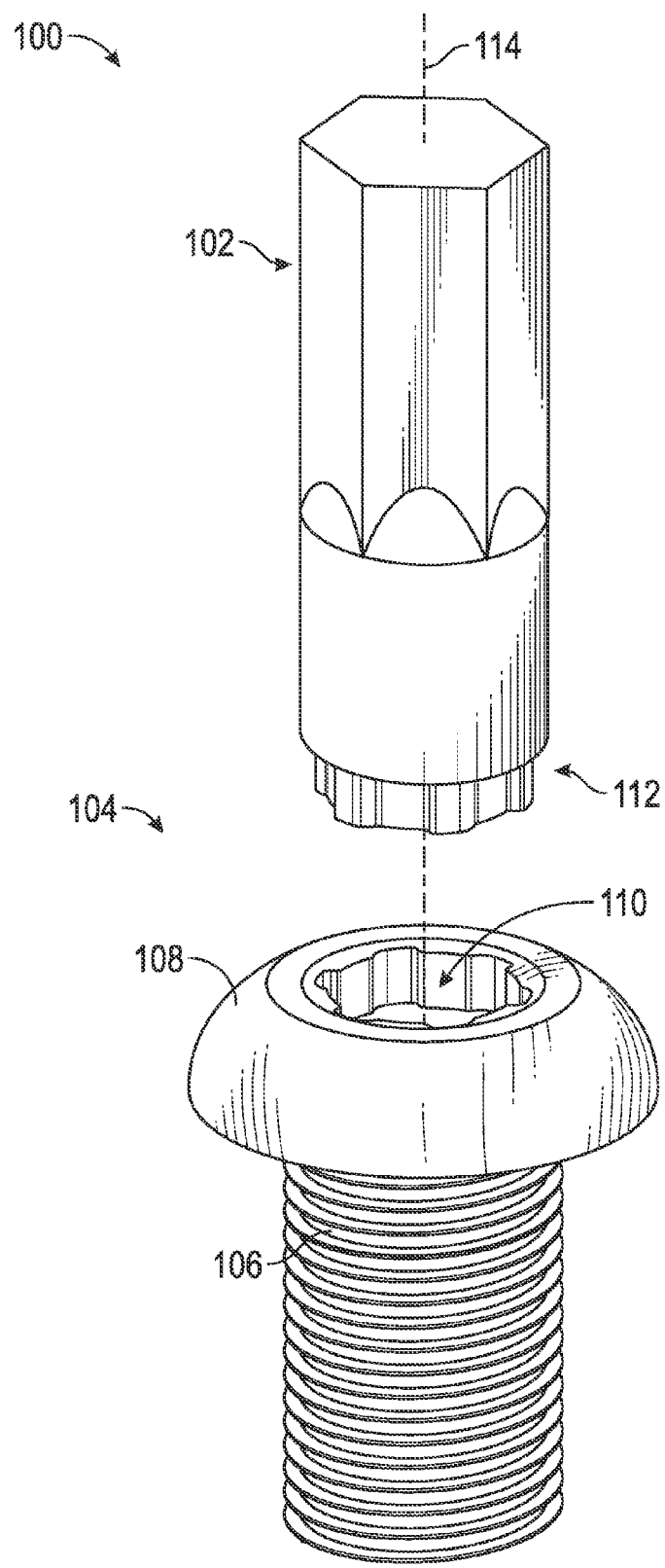
FIG. 1 representatively illustrates a perspective view of a fastener and a mating driver bit in accordance with an exemplary embodiment of the present technology.

Referring now to FIG. 1, in an exemplary embodiment of the present technology, an asymmetrical fastening system 100 may comprise a driver bit 102 and a fastener 104 having a head portion 108. The fastener 104 may also comprise a shank portion 106 such as that found on a bolt or screw. The driver bit 102 and the fastener 104 may share a common longitudinal axis 114 when mated together. The driver bit 102 may comprise any suitable device or system for mating with the fastener 104 to facilitate a transfer of torque from the driver bit 102 to the fastener 104. For example, the driver bit 102 may comprise a multi-finned surface 112 configured to be selectively inserted into a recessed receiving area 110 of the fastener 104 and engage a surface wall of the recessed receiving area 110 that is suitably configured to substantially conform to the multi-finned surface 112 of the driver bit 102.

The engagement between the driver bit 102 and the fastener 104 may comprise any suitable relationship. For example, in one embodiment, a tolerance difference of about 0.002 inches to about 0.008 inches may exist between the multi-finned surface 112 of the driver bit 102 and the recessed receiving area 110 of the fastener 104. In an alternative embodiment, the tolerance difference between the multi-finned surface 112 and the recessed receiving area 110 may be small enough such that there is sufficient surface contact between the two surfaces to couple the driver bit 102 and the fastener 104 together such that the fastener 104 does not fall off or otherwise automatically disengage from the driver bit 102 after the multi-finned surface 112 has been inserted into the recessed receiving area 110 of the fastener 104.

The fastener 104 may comprise any suitable device or system for providing a substantially conforming fit with the driver bit 102. For example, referring now to FIGS. 2A, 2B, 3A, and 3B, the recessed receiving area 110 may comprise a wall 202 extending into the head portion 108 of the fastener 104. The wall 202 may be configured in any suitable shape or dimension for receiving the driver bit 102 and may include one or more surfaces adapted to allow for the transfer of torque between the driver bit 102 and the fastener 104.

In one embodiment, the wall 202 may comprise a surface oriented around a longitudinal axis 210 of the fastener 104. The surface may define the recessed receiving area 110. The wall 202 may comprise a top edge 302 that forms an opening to the recessed receiving area 110 and a bottom edge 304 disposed proximate to a lower section of the recessed receiving area 110. The wall 202 may comprise a substantially vertical surface extending between the top edge 302 and the bottom edge 304. The substantially vertical surface may be substantially parallel to the longitudinal axis 210 of the fastener 104.

In an alternative embodiment, the wall 202 may taper relative to the longitudinal axis 210 of the fastener 104. For example, the wall 202 may taper inwardly towards the longitudinal axis 210 of the fastener 104 from the top edge 302 and the bottom edge 304 such that a cross-sectional area of the recessed receiving area 110 decreases as the recessed receiving area 110 extends further into the head portion 108. The taper may correspond to the dimensions of the driver bit 102 to facilitate a wedge-like fit between the fastener 104 and the driver bit 102. The taper of the wall 202 may comprise any suitable angle based upon varying criteria such as circumference of the head portion 108, height of the head portion 108, and/or the strength of the material used to fabricate the fastener 104 or the driver bit 102. For example, in one embodiment, the wall 202 may have a taper of between two and fifteen degrees relative to the longitudinal axis 210.

The wall 202 may be defined by one or more recessed torque surfaces 214 and one or more torque surface gaps 212 arranged around the longitudinal axis 210 and suitably configured to receive the mating driver bit 102. The torque surface gaps 212 may comprise surfaces spaced around a circumference defined by a radial line from the longitudinal axis 210. Each recessed torque surface 214 provides a contact surface for the driver bit 102 allowing the fastener 104 to be selectively rotated about the longitudinal axis 210 in a first direction under a driving force and in a second direction under a removal force. For example, the driving force may comprise an installation torque supplied by any suitable device such as a screw driver, a wrench, a powered drill, and the like configured with or coupled to the driver bit 102. Similarly, the removal force may comprise a torque supplied in a substantially opposite direction as the driving force.

Figure 3A:
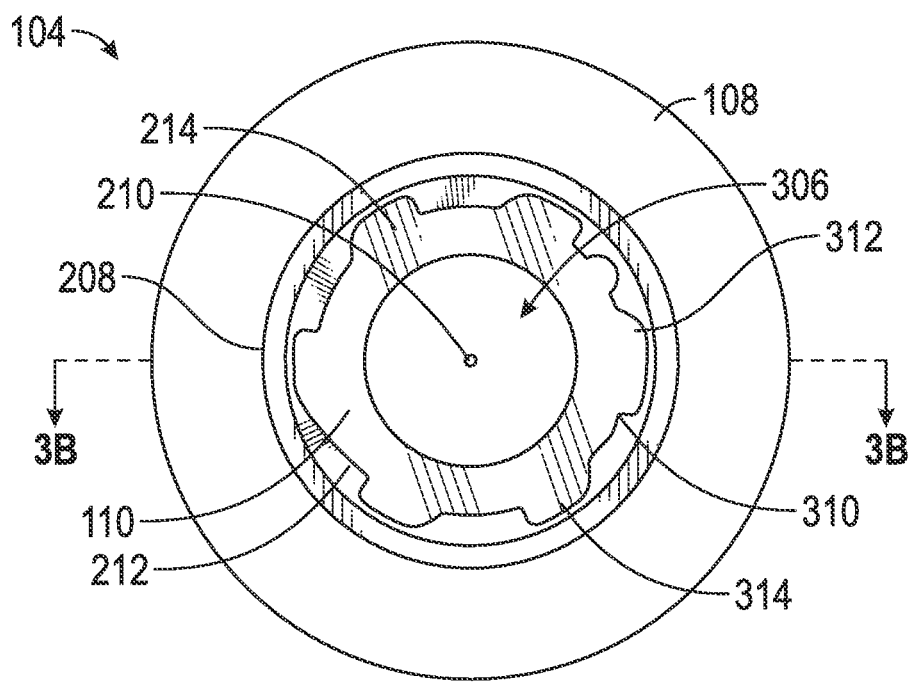
FIG. 3A representatively illustrates a top view of a second fastener in accordance with an exemplary embodiment of the present technology.
Figure 3B:
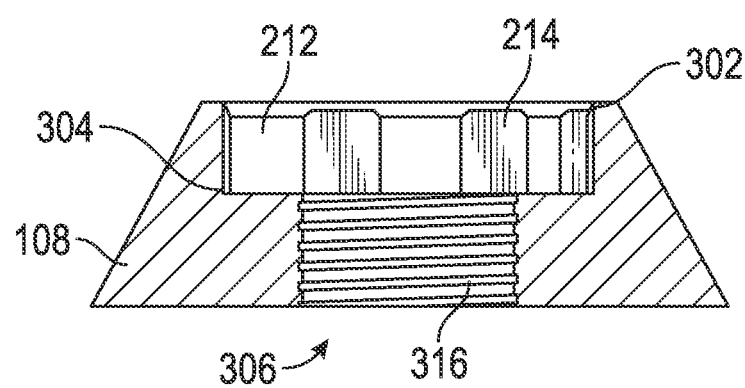
FIG. 3B representatively illustrates a cross-sectional view of the second fastener across line 3B-3B of FIG. 3A in accordance with an exemplary embodiment of the present technology.

Referring now to FIG. 3A, in one embodiment, any individual recessed torque surface 214 may comprise a different width relative to one or more other of the remaining recessed torque surfaces 214. The width may be defined by an arc made up of one or more sections of the recessed torque surface 214 relative to the longitudinal axis 210 of the fastener 104. Similarly, an individual torque surface gap 212 may comprise a different width relative to one or more other torque surface gaps 212 and the width may be defined by the arc of the torque surface gap 212 relative to the longitudinal axis 210 of the fastener 104.

Each recessed torque surface 214 may comprise a driving surface 310, a removal surface 312, and a transition surface 314 extending between the driving surface 310 and the removal surface 312. Each torque surface gap 212 from the one or more torque surface gaps 212 extends between the driving surface 310 of one recessed torque surface 214 and the removal surface 312 of an adjacent recessed torque surface 214.

Figure 4:
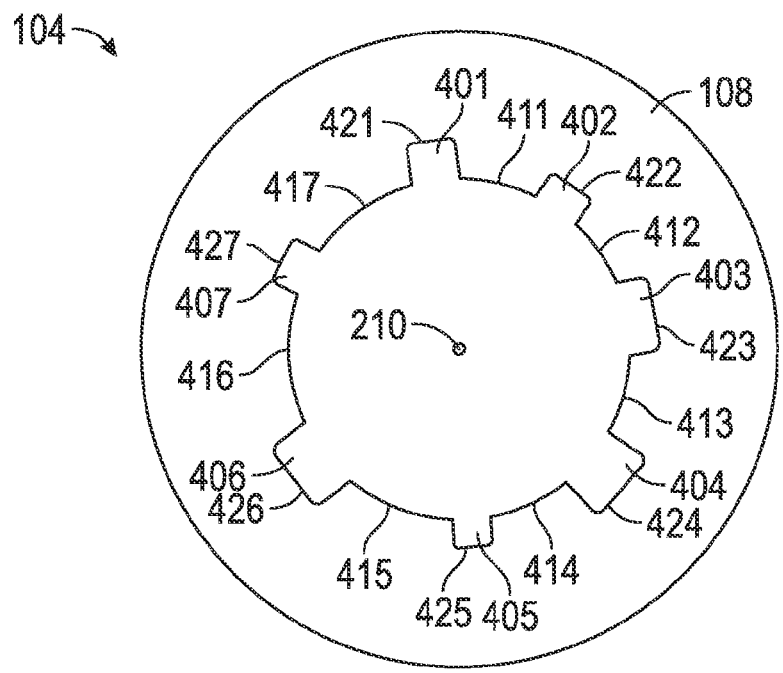
FIG. 4 representatively illustrates a top view of the fastener incorporating torque surfaces and torque surface gaps of varying widths in accordance with an exemplary embodiment of the present technology.
Figure 5:
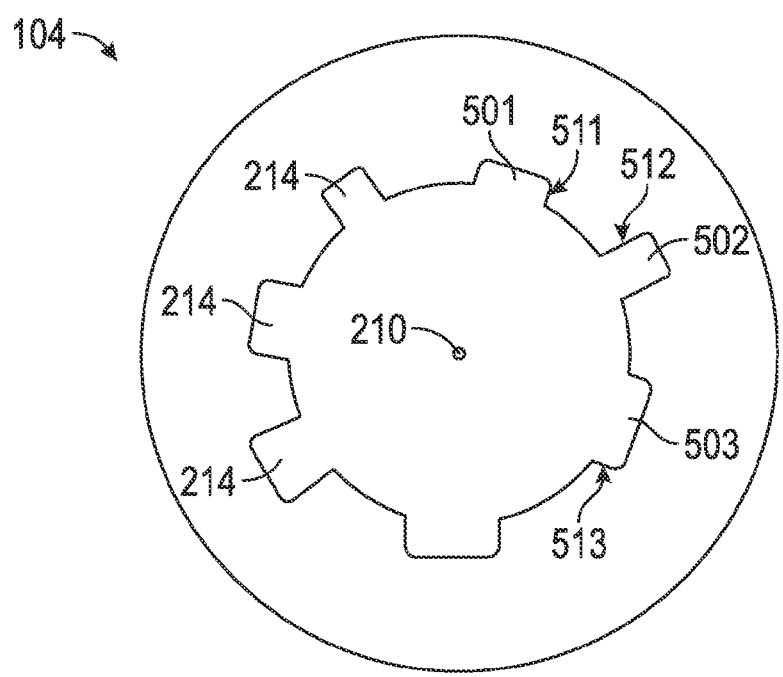
FIG. 5 representatively illustrates a top view of the fastener incorporating torque surfaces of varying heights in accordance with an exemplary embodiment of the present technology.
Figure 6:
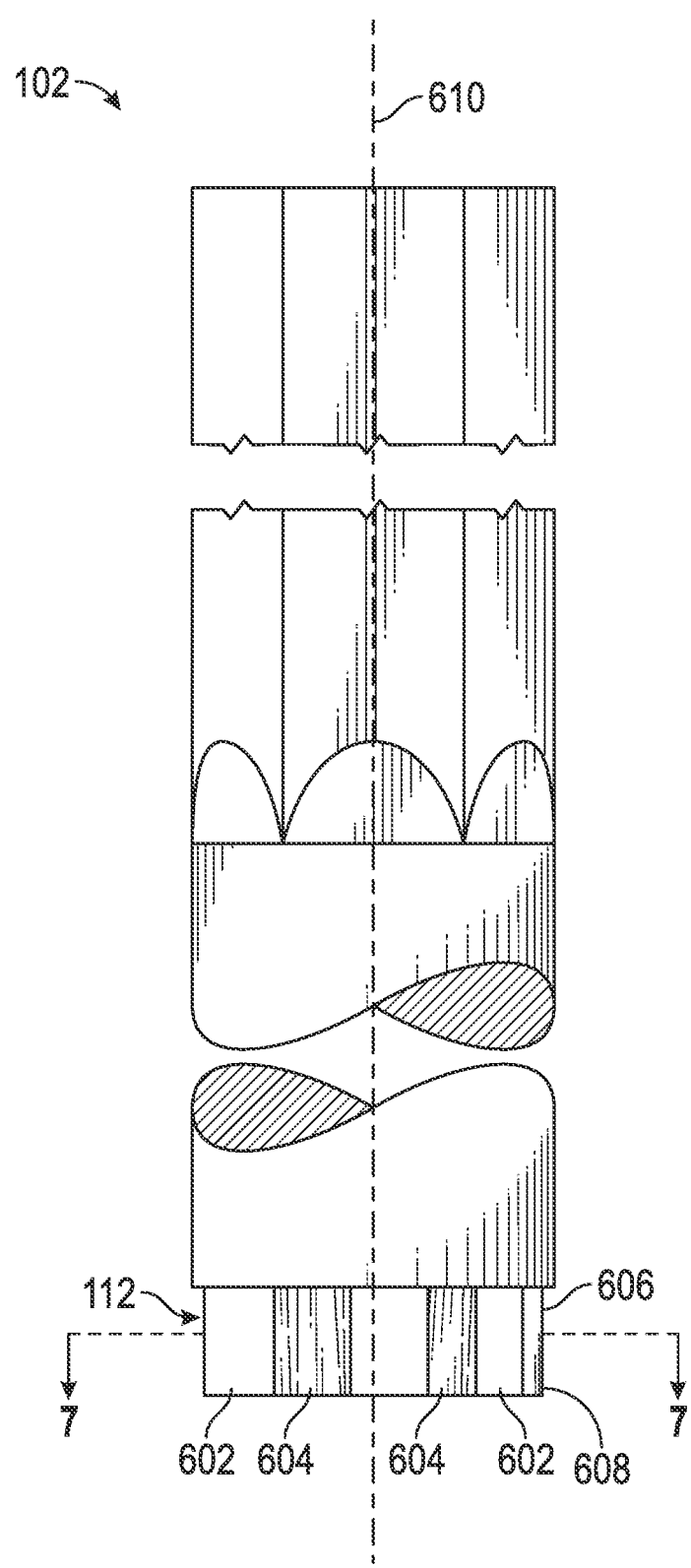
FIG. 6 representatively illustrates a side view of the driver bit in accordance with an exemplary embodiment of the present technology.

Referring now to FIGS. 3A, 4 and 5, the width of each recessed torque surface 214 may be defined by the transition surface 314 of a corresponding recessed torque surface 214. For example, a first recessed torque surface 401 may have a width defined by the arc of a first transition surface 421. Likewise, a second recessed torque surface 402 may have a width defined by the arc of a second transition surface 422. A first torque surface gap 411 may extend between the first recessed torque surface 401 and the second recessed torque surface 402. A width of the first torque surface gap 411 may be defined by the arc of the distance that extends between the driving surface 310 of the first recessed torque surface 401 and the removal surface 312 of the second recessed torque surface 402. A second torque surface gap 412 may extend between the driving surface 310 of the second recessed torque surface 402 and the removal surface 312 of a third recessed torque surface 403. The third recessed torque surface 403 may have a width defined by the arc of a third transition surface 423. A repeating pattern of alternating recessed torque surfaces 404, 405, 406, 407 and torque surface gaps 414, 415, 416, 417 may continue around a circumference of the wall 202.

In an alternative embodiment, the width of any given recessed torque surface 214 may not be determined according to the arc extending between the driving surface 310 and the removal surface 312. For example, referring again the FIG. 3A, in one embodiment, one or more of the driving surface 310 and the removal surface 312 may comprise a rounded or angled surface that does not align with the longitudinal axis 210. In this instance, the width of the recessed torque surface 214 may be determined according to the total arc defined by the transition surface, the driving surface 310, and the removal surface 312 that extend between two torque surface gaps 212.

The fastener 104 may comprise any suitable number of recessed torque surfaces 214 and torque surface gaps 212. This number may be determined according to any suitable criteria such as a radius of the head portion 108, fastener material, expected torque requirements of the fastener 104, a desired level of security, and the like. For example, in one embodiment the fastener 104 may comprise seven recessed torque surfaces 214 and torque surface gaps 212. A second embodiment of the fastener 104 may comprise five recessed torque surfaces 214 and torque surface gaps 212. In a third embodiment, the fastener 104 may comprise between two and fifteen recessed torque surfaces 214 and torque surface gaps 212.

Referring now to FIG. 4, the width of any given recessed torque surface 214 or torque surface gap 212 may comprise any desired value. In one embodiment, the width of the first recessed torque surface 401 may be equal to one or more of the remaining recessed torque surfaces 402, 403, 404, 405, 406, 407 or the width of the first recessed torque surface 401 may be different from all of the remaining recessed torque surfaces 402, 403, 404, 405, 406, 407. For example, the first transition surface 421 may comprise a width of about 27 degrees, the second transition surface 422 may comprise a width of about 18 degrees, the third transition surface 423 may comprise a width of about 36 degrees, a fourth transition surface 424 may comprise a width of about 30 degrees, a fifth transition surface 425 may comprise a width of about 15 degrees, a sixth transition surface 426 may comprise a width of about 21 degrees, and a seventh transition surface 427 may comprise a width of about 24 degrees.

Similarly, the width of the first torque surface gap 411 may be equal to one or more of the remaining torque surface gap 412, 413, 414, 415, 416, 417 or the width of the first torque surface gap 411 may be different from all of the remaining recessed torque surfaces 412, 413, 414, 415, 416, 417. For example, the first torque surface gap 411 may comprise a width of about 27 degrees, the second torque surface gap 412 may comprise a width of about 18 degrees, the third torque surface gap 413 may comprise a width of about 21 degrees, a fourth torque surface gap 414 may comprise a width of about 24 degrees, a fifth torque surface gap 415 may comprise a width of about 36 degrees, a sixth torque surface gap 416 may comprise a width of about 33 degrees, and a seventh torque surface gap 417 may comprise a width of about 30 degrees.

The width of any given recessed torque surface 214 or torque surface gap 212 may comprise any suitable value between about 5 degrees to about 290 degrees. The width of any given recessed torque surface 214 or torque surface gap 212 may be limited by any suitable criteria such as a total number of recessed torque surfaces 214 and torque surface gaps 212 positioned in the wall 202. Another limiting factor relates to the circular nature of the wall 202 that may proscribe an upper limit of 360 degrees for the total width of the total of all recessed torque surfaces 214 and torque surface gaps 212.

In addition to comprising varying widths, the recessed torque surfaces 214 may be configured with varying degrees of fin depths relative to portions of the wall 202 area associated with the torque surface gaps 212. The fin depths may correspond to substantially similar fin heights on the driver bit 102. The fin depth associated with any given recessed torque surface 214 may comprise any suitable value and may be determined according to any suitable criteria. The fin depth may correspond to a distance that the driving surface 310 and removal surface 312 separates the transition surface 314 from the torque surface gap 212.

In one embodiment, the fin depth of each recessed torque surface 214 may be selected from between two and six predetermined values. For example, referring now to FIG. 5, a first recessed torque surface 501 may comprise a first fin depth 511, a second recessed torque surface 502 may comprise a second fin depth 512, and a third recessed torque surface 503 may comprise a third fin depth 513. Each of the first, second, and third fin depths 511, 512, 513 may comprise different values such that there are three distinct values that the fin depth of each individual recessed torque surface 214 could be selected from.

Referring again to FIG. 3A, the driving surface 310 of the torque surface 214 provides a contact area for receiving an applied torque from the driver bit 102. The driving surface 310 may be configured to comprise any suitable shape or dimension. In one embodiment, the driving surface 310 may comprise a substantially flat face that is configured to be oriented perpendicular to the driving force such that the face of the driving surface 310 is substantially parallel to a radial line extend from the longitudinal axis 210. The driving surface 310 may also be configured to receive the driving force at a substantially 90° angle. In an alternative embodiment, the driving surface 310 may be oriented at an angle relative to a radial line extending from the longitudinal axis 210 such that a driving force is applied to the driving surface 310 at an angle other than 90°.

The driving surface 310 may also remain approximately parallel along an insertion direction of the fastener 104 from the top edge 302 to the bottom edge 304 of the recessed receiving area 110 even if the wall 202 tapers inward. As a result, the driving surface 210 forms a large contact area that may be engaged by the driver bit 102 during engagement. The large contact area allows an applied torque to be more evenly distributed across the entire driving surface and may allow for increased torque values while also being less susceptible to cam-out.

The removal surface 312 provides a second contact area for receiving an applied torque from the driver bit 102. The removal surface 312 may be configured to comprise any suitable shape or dimension. Referring again to FIG. 3A, in one embodiment, the removal surface 312 may be configured substantially the same as the driving surface 310 such that the removal force is applied at a substantially 90° angle to the removal surface 312. Alternatively, the removal surface 312 may be configured with an angled surface relative to the longitudinal axis 210 such that the removal force is applied at an oblique angle reducing an amount of torque force that may be used to loosen the fastener 104.

Figure 2A:
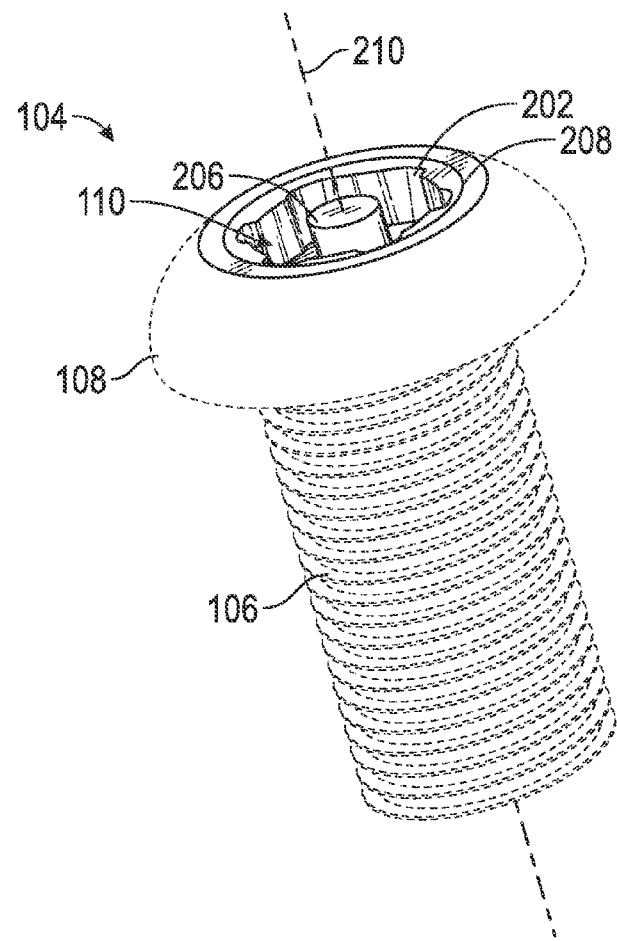
FIG. 2A representatively illustrates a perspective view of the fastener in accordance with an exemplary embodiment of the present technology.
Figure 2B:
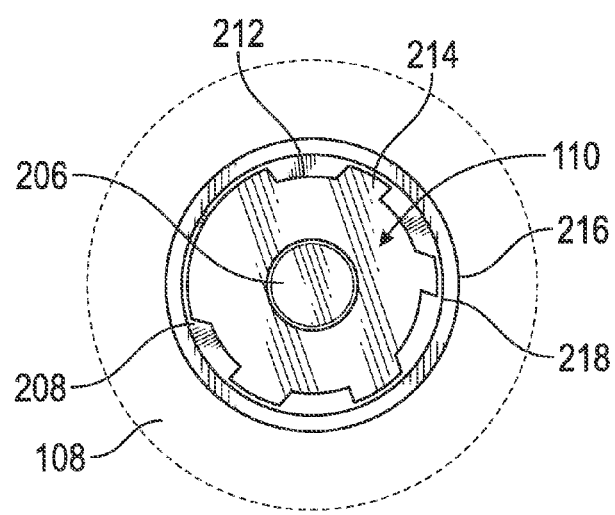
FIG. 2B representatively illustrates a top view of the fastener in accordance with an exemplary embodiment of the present technology.

Referring now to FIGS. 2A, 2B and 3A, the head portion 108 may further comprise a radiused counter bore 208 configured to help funnel the driver bit 102 towards the recessed receiving area 110. The radiused counter bore 208 may comprise any suitable shape adapted to capture the driver bit 102 and guide it to the recessed receiving area 110. For example, in one embodiment, the radiused counter bore 208 may comprise an inward sloping surface having a larger radius along a first surface 216 of the head portion 108 and a smaller radius along a second surface 218 disposed between the top edge 302 and the first surface 216 of the head portion 108.

Referring now to FIGS. 2A and 2B the fastener 104 may comprise a center pin 206 that projects upward from a bottom portion of the recessed receiving area 110. The center pin 206 may be configured to increase security of the fastener 104 by making it more difficult to position any device into the recessed receiving area 110 in an attempt to apply a torque force to the fastener 104. The center pin 206 may comprise any suitable shape, height, or circumference. For example, in one embodiment, the center pin 206 may comprise a substantially rounded body configured to extend at least partially into a center portion of the driver bit 102 to allow the driver bit 102 to be rotated about the center pin 206 until the recessed torque surfaces 214 and torque surface gaps 212 are aligned to the mating surfaces of the driver bit 102. Once the mating surfaces are aligned, the driver bit 102 may be inserted into the recessed receiving area 110.

Referring now to FIGS. 3A, 3B, 9B, and 9C the fastener 104 may comprise a nut having a center opening 306 that extends downward into the head portion 108 to create a thru channel. The center opening 306 may be configured to allow a threaded portion of a bolt or screw to pass though the fastener 104. An interior wall of the center opening 306 may be threaded to allow the shank portion of a bolt 904 to rotatably pass through the fastener 104 as the fastener 104 is coupled to the bolt 904. The center opening 306 may comprise any suitable shape, height, or circumference Referring again to FIG. 1, the driver bit 102 is configured to provide a torque force to the fastener 104. The driver bit 102 may comprise any suitable shape or size for engaging with the fastener 104. For example, the driver bit 102 may comprise a surface suitably configured to engage or otherwise substantially conform to the surfaces located within the recessed receiving area 110. In one embodiment, the driver bit 102 may be adapted to provide a stick-fit when inserted into the recessed receiving area 110 such that the surface frictional forces between the driver bit 102 and the recessed receiving area 110 of the fastener 104 are sufficient to couple the driver bit 102 and the fastener 104 together.

Figure 7:
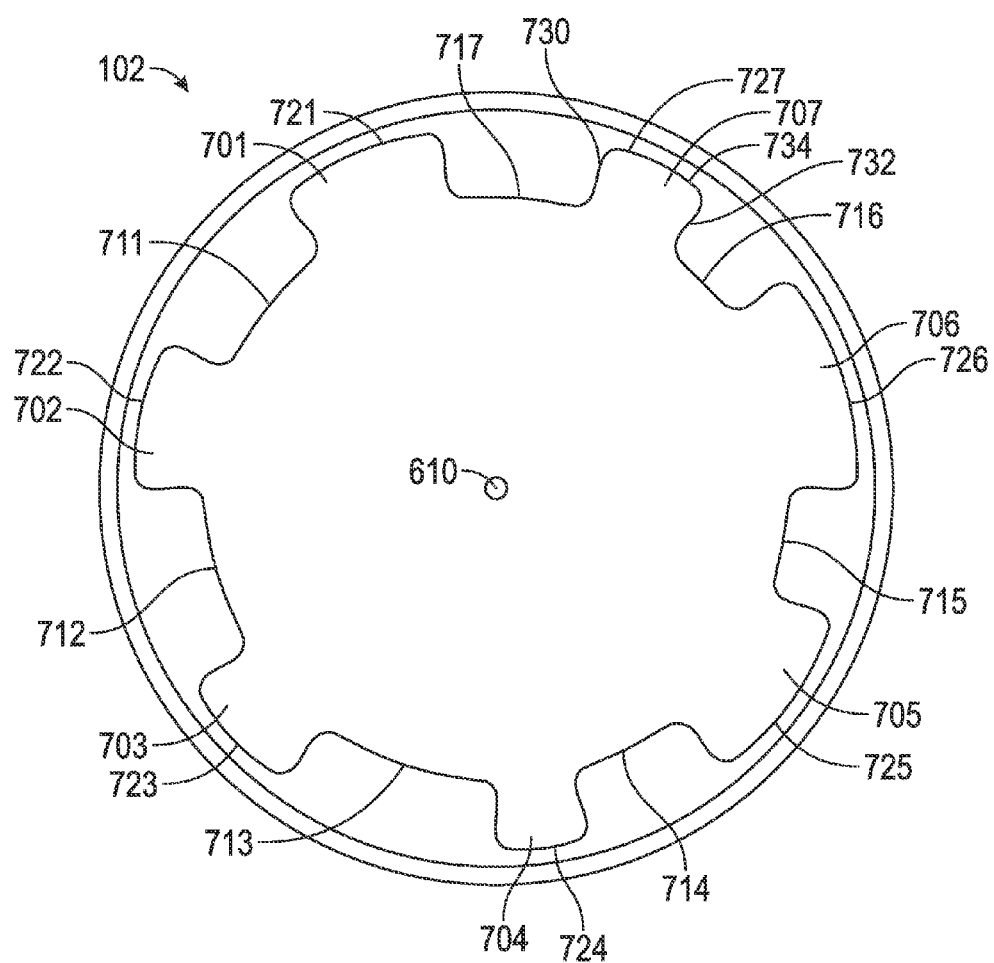
FIG. 7 representatively illustrates a cross-sectional view across line 7-7 of FIG. 6 in accordance with an exemplary embodiment of the present technology.
Figure 8A:
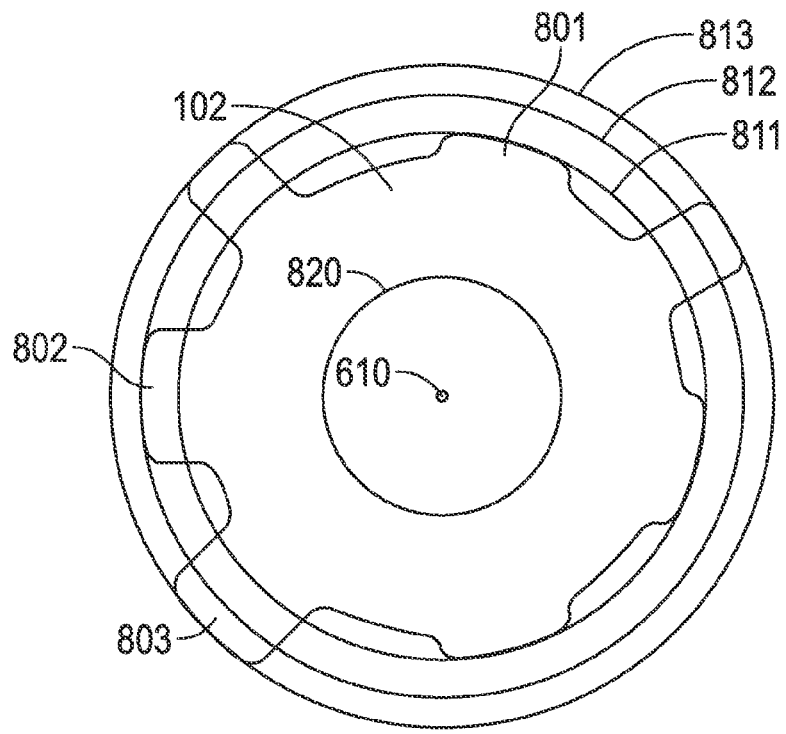
FIG. 8A representatively illustrates an end view of a seven fin driver bit having variable fin heights in accordance with an exemplary embodiment of the present technology.
Figure 8B:
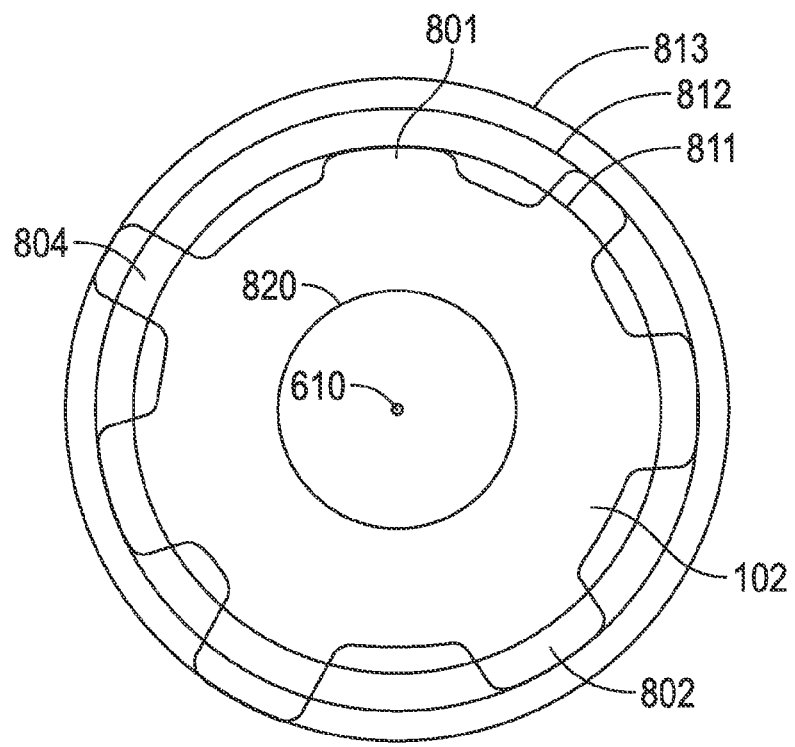
FIG. 8B representatively illustrates an end view of a second seven fin driver bit having variable fin heights in accordance with an exemplary embodiment of the present technology.
Figure 9A:
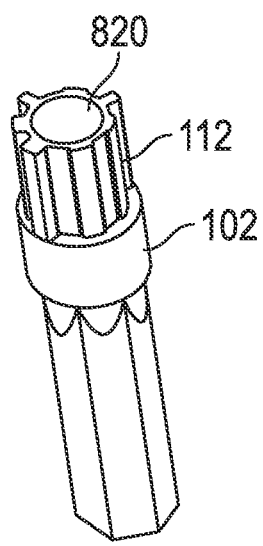
FIG. 9A representatively illustrates an end view of a driver bit having an open center section in accordance with an exemplary embodiment of the present technology.
Figure 9B:
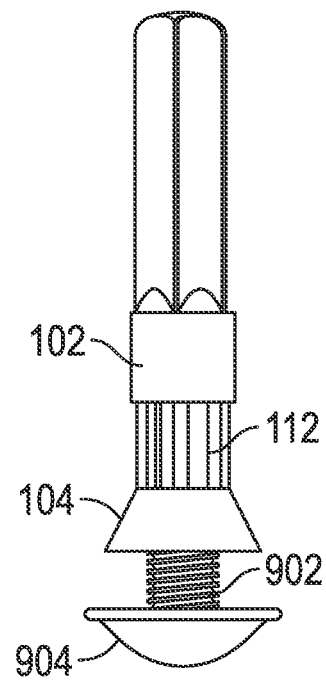
FIG. 9B representatively illustrates a side view of the driver bit engaging a fastener in accordance with an exemplary embodiment of the present technology.
Figure 9C:
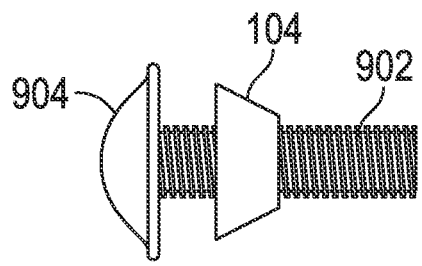
FIG. 9C representatively illustrates a side view of the fastener positioned partway down a bolt with the driver bit disengaged from the fastener in accordance with an exemplary embodiment of the present technology.

Referring now to FIGS. 6, 7, 8A and 8B, in one embodiment, an exterior surface of the driver bit 102 may comprise a plurality of fins 602 oriented around a longitudinal axis 610 of the driver bit 102 that extend between a base portion 606 of the driver bit 102 and an end portion 608 of the driver bit 102. The exterior surface of the driver bit 102 may further comprise a plurality of fin gaps 604 positioned between the fin 602 that also extend between the base portion 606 of the driver bit 102 and the end portion 608 of the driver bit 102. Referring now to FIGS. 7, 8A and 8B, the plurality of fins 602 may extend outward from the exterior surface of the driver bit 102 relative to the plurality of fin gaps 604. Each fin 602 may comprise a driving wall 730, a removal wall 732, and a transition wall 734 extending between the driving wall 730 and the removal wall 732. Each of these walls may be suitably configured to mate to a corresponding surface of the fastener 104.

A width of each fin 602 may be defined by the transition wall 734. For example, a first tin 701 may have a width defined by the arc of a first transition wall 721. Likewise, a second fin 702 may have a width defined by the arc of a second transition surface 722. A fin gap 711 may extend between the first fin 701 and the second tin 702. A width of the first tin gap 711 may be defined by the arc of the distance that extends between the driving wall 730 of the first fin 701 and the removal wall 732 of the second fin 702. A second fin gap 712 may extend between the second fin 702 and a third fin 703. The third fin 703 has a width defined by the arc of a third transition wall 723. A repeating pattern of alternating fins 704, 705, 706, 707 and fin gaps 714, 715, 716, 717 may continue around the circumference of the driver bit 102.

The driver bit 102 may comprise any suitable number of fins 602 and fin gaps 602. This number may be determined according to any suitable criteria such as a radius of the driver bit 102, component material, expected torque requirements of the driver bit 102, a corresponding fastener 104, a desired level of security, and the like. For example, in one embodiment the driver bit 102 may comprise seven fins 602 and seven fin gaps 604. A second embodiment of the driver bit 102 may comprise six fins 602 and six fin gaps 604. In a third embodiment, the driver bit 102 may comprise between two and fifteen fins 602 and fin gaps 604.

Referring now to FIG. 7, for a driver bit 102 having seven fins, the width of any given fin 701, 702, 703, 704, 705, 706, 707 or fin gap 711, 712, 713, 714, 715, 716, 717 may comprise any desired value. In one embodiment, the width of the first fin 701 may be equal to one or more of the remaining fins 702, 703, 704, 705, 706, 707 or the width may be different from all of the remaining fins 702, 703, 704, 705, 706, 707. For example, a driver bit 102 may comprise seven fins wherein the first transition wall 721 may comprise a width of about 27 degrees, the second transition wall 722 may comprise a width of about 18 degrees, the third transition wall 723 may comprise a width of about 36 degrees, a fourth transition wall 724 may comprise a width of about 30 degrees, a fifth transition wall 725 may comprise a width of about 15 degrees, a sixth transition wall 726 may comprise a width of about 21 degrees, and a seventh transition wall 727 may comprise a width of about 24 degrees.

Similarly, the width of the first fin gap 711 may be equal to one or more of the remaining fin gaps 712, 713, 714, 715, 716, 717 or the width may be different from all of the remaining fin gaps 712, 713, 714, 715, 716, 717. For example, the first fin gap 711 may comprise a width of about 27 degrees, the second fin gap 712 may comprise a width of about 18 degrees, the third fin gap 713 may comprise a width of about 21 degrees, a fourth fin gap 714 may comprise a width of about 24 degrees, a fifth fin gap 715 may comprise a width of about 36 degrees, a sixth fin gap 716 may comprise a width of about 33 degrees, and a seventh fin gap 717 may comprise a width of about 30 degrees.

The width of any given fin 602 or fin gap 604 may comprise any suitable value between about 5 degrees to about 290 degrees. The width of any given fin 602 or fin gap 604 may be limited by any suitable criteria such as a total number of tins 602 and fin gaps 604 disposed along the exterior surface of the driver bit 102. Another limiting factor relates to the circular nature of the driver bit 102 that proscribes an upper limit of 360 degrees for the total arc width of all fins 602 and fin gaps 604.

In addition to comprising varying widths, the fins 602 may be configured with varying degrees of fin height. The fin height may correspond to the distance that the driving wall 730 and removal wall 732 separates the transition wall 734 from the fin gap 604. The fin height of each fin 602 may correspond to substantially similar fin depths on the fastener 104. The fin height associated with any given fin 602 may comprise any suitable value and may be determined according to any suitable criteria. In one embodiment, the fin height of each fin 602 may be selected from between two and six predetermined values. For example, referring now to FIGS. 8A and 8B, a first fin 801 may comprise a first fin height 811, a second fin 802 may comprise a second fin height 812, and a fin 803 may comprise a third fin height 813. Each of the first, second, and third fin heights 811, 812, 813 may comprise different values such that there are three distinct values that the fin height of each individual fin 602 could be selected from.

Referring now to FIGS. 2B, 3A, 8A, 8B, 9A, 98, and 9C, the driver bit 102 may further comprise a bit opening 820 oriented around the longitudinal axis 610 of the driver bit 102. The bit opening 820 may comprise any suitable shape or size and may be suitably configured to fit around the center pin 206 or a threaded section 902 of the bolt 904.

The driver bit 102 or the recessed receiving area 110 may be formed by any suitable method such as by forming, forging, casting, cutting, grinding, milling, and the like. In one embodiment, the number of fins 602 and the width of each fin 602 of a particular driver bit 102 may be predetermined according to a set of criteria associated with a particular use or user. A blank bit may then be selected and subjected to a process for forming the individual fins 602. For example, a milling operation may be used to cut out portions of the blank bit thereby creating the individual fins 602 and fin gaps 604. Additional operations may be utilized to form the fin heights as necessary.

The fastener 104 and the recessed receiving area 110 may be formed through a metal operation such as cold heading. For example, a wire blank may be fed into a heading machine and cut to a predetermined length. The wire blank may then be positioned in front of a die. The wire blank may then be forced into the die by an upset tool in a first blow forming an intermediate shape. A second blow may be applied to the intermediate shape with a hammer that is suitably configured to form a head height and a diameter of the head portion 108 of the fastener 104. The hammer may also comprise a drive suitably configured to form the recessed receiving area 110 during the second blow. The fastener 104 may then be ejected from the header machine and moved to a subsequent operation such as to have threads applied to the shank portion 106 or the center opening 306. Subsequently, the drive may be subjected to additional operations to transform the drive into the driver bit 102 that will be used to apply the torque force to the fastener 104. Therefore, the dimensions of the wall 202 and the recessed torque surfaces 214 may be substantially identical to the dimensions of the fins 602 since the driver bit 102 was used to form the recessed receiving area 110.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A fastening system, comprising:
   a driver bit having a driving end with an exterior surface oriented around a longitudinal axis of the driver bit, wherein the exterior surface comprises:
      between five and nine outwardly projecting fins, wherein:
         each fin comprises a transition wall extending between a first driving surface and a second driving surface, wherein the transition wall comprises a transition wall width defined by a fin arc length;
         the transition wall width of at least two of the outwardly projecting fins are not equal to each other;
         the transition wall of a first outwardly projecting fin is positioned outward from the longitudinal axis a first radial distance;
         the transition wall of a second outwardly projecting fin is positioned outward from the longitudinal axis a second radial distance; and
         the first radial distance is not equal to the second radial distance; and
      a plurality of fin gaps, wherein:
         each fin gap from the plurality of fin gaps is disposed between two outwardly projecting fins and comprises a fin gap width defined by a fin gap arc length; and
         the fin gap width of at least two of the plurality of fin gaps are not equal to each other; and
   a fastener having a head portion and a recessed receiving area disposed within the head portion, wherein the recessed receiving area is configured to mate to the exterior surface of the driver bit.

2. A fastening system according to claim 1, wherein a sum of all of the transition wall widths and fin gap widths equals 360 degrees.

3. A fastening system according to claim 1, wherein:
   each transition wall comprises a different width than any other transition wall; and
   each fin gap comprises a different width than any other fin gap.

4. A fastening system according to claim 1, wherein:
   the transition wall of a third outwardly projecting fin is positioned outward from the longitudinal axis a third radial distance; and
   the third radial distance is not equal to the first or second radial distance.

5. A fastening system according to claim 1, wherein:
   the driving end further comprises a center opening forming an interior surface oriented around the longitudinal axis; and
   the head portion of the fastener further comprises a pin extending upward from a center portion of the recessed receiving area, wherein the pin is configured to fit into the center opening of the driving end when the driving bit and the fastener are mated together.

6. A driver for a fastening device having a recessed receiving area, comprising:
   a body having a driving end with an exterior surface oriented around a longitudinal axis of the body, wherein the driving end is configured to mate to the recessed receiving area of the fastening device;

a plurality of outwardly projecting fins positioned on the exterior surface of the driving end, wherein:

each fin comprises a fin width forming a transition wall disposed between a driving wall and a removal wall of between about three and about one hundred eighty degrees, wherein the transition wall is disposed at a radial distance from the longitudinal axis; and the fin width of at least one fin is different than at least one of the remaining fins;

a first transition wall of a first fin is positioned a first radial distance from the longitudinal axis;

a second transition wall of a second fin is positioned a second radial distance from the longitudinal axis; and the first radial distance is less than the second radial distance; and a plurality of fin gaps positioned on the exterior surface of the driving end, wherein:

the plurality of fin gaps are interspersed among the plurality of fins such that any two consecutive fins are separated by one fin gap;

the plurality of fins comprises the same number as the plurality of fin gaps;

each fin gap comprises a gap width of between about 3 and about 180 degrees; and the fin gap width of at least one fin gap is different than at least one of the remaining fin gaps, and wherein a sum of the widths of the plurality of fins and the plurality of fin gaps is equal to 360 degrees.

7. A driver according to claim 6, wherein:
each fin width comprises a different value than any other fin; and
each fin gap width comprises a different value than any other fin gap.

8. A driver according to claim 6, wherein:
a third transition wall of a third fin is positioned a third radial distance from the longitudinal axis; and
the third radial distance is greater than each of the first radial distance and the second radial distance.

9. A driver according to claim 6, wherein:
the driving wall of any fin is not coplanar with the driving wall of any remaining fin; and
the removal wall of any fin is not coplanar with the removal wall of any remaining fin.

10. A driver according to claim 6, further comprising a center opening in the driving end forming an interior surface oriented around the longitudinal axis.

11. A fastening device having a head portion with a recessed receiving area extending into the head portion disposed around a longitudinal axis of the head portion, comprising:

a wall defining the recessed receiving area;
a plurality of torque surfaces disposed along the wall, wherein:

each torque surface comprises a width of between about three and about one hundred eighty degrees;

the width of at least one torque surface comprises a different width than at least one of the remaining torque surfaces;

the plurality of torque surfaces each comprise a transition surface disposed between a driving surface and a removal surface, wherein the transition surface is positioned at a radial distance from the longitudinal axis;

a first transition surface of a first torque surface comprises a first radial distance;

a second transition surface of a second torque surface comprises a second radial distance; and the first radial distance is less than the second radial distance; and a plurality of torque surface gaps disposed along and projecting outward from the wall, wherein:

the plurality of torque surface gaps are interspersed among the plurality of torque surfaces such that any two consecutive torque surfaces are separated by one torque surface gap;

each torque surface gap comprises a gap width of between about 3 and about 180 degrees; and the gap width of at least one torque surface gap comprises a different width than at least one of the remaining torque surface gaps, and wherein a sum of the widths of the plurality of torque surfaces and the plurality of torque surface gaps is equal to 360 degrees.

12. A fastening device according to claim 11, wherein:
the width of each torque surface is different than any other torque surface; and
the width of each torque surface gap is different than any other torque surface gap.

13. A fastening device according to claim 11, wherein:
a third transition surface of a third torque surface comprises a third radial distance; and
the third radial distance is greater than each of the first radial distance and the second radial distance.

14. A fastening device according to claim 11, wherein:
the driving surface of any torque surface is not coplanar with the driving surface of any remaining torque surface; and
the removal surface of any torque surface is not coplanar with the removal surface of any remaining torque surface.

15. A fastening device according to claim 11, wherein the head portion further comprises a pin extending upward from a center portion of the recessed receiving area.

16. A fastening device according to claim 11, wherein the recessed receiving area of the head portion further comprises:

an open center section extending through the head portion forming an axial pathway; and
a threaded wall disposed along the open center section.

* * * * *